United States Patent
Bastnagel

(10) Patent No.: US 9,562,476 B2
(45) Date of Patent: Feb. 7, 2017

(54) GAS TURBINE ENGINE THERMALLY CONTROLLED FLOW DEVICE

(71) Applicant: Rolls-Royce Corporation, Indianapolis, IN (US)

(72) Inventor: Thomas E. Bastnagel, Danville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 461 days.

(21) Appl. No.: 14/105,904

(22) Filed: Dec. 13, 2013

(65) Prior Publication Data

US 2014/0250899 A1    Sep. 11, 2014

Related U.S. Application Data

(60) Provisional application No. 61/774,176, filed on Mar. 7, 2013.

(51) Int. Cl.
*F02C 7/20* (2006.01)
*F01D 17/08* (2006.01)
(Continued)

(52) U.S. Cl.
CPC ............... *F02C 7/20* (2013.01); *F01D 17/085* (2013.01); *F01D 17/141* (2013.01);
(Continued)

(58) Field of Classification Search
CPC ....... F23R 3/60; G05D 23/022; G05D 23/025; F16K 31/002
See application file for complete search history.

(56) References Cited

U.S. PATENT DOCUMENTS 2,109,628 A    3/1938 Alban et al.
2,980,394 A    4/1961 Rowlett et al.
(Continued)

FOREIGN PATENT DOCUMENTS

GB    815240 A    *   6/1959   ........... G05D 23/022
GB    2390663 A    1/2004

OTHER PUBLICATIONS

International Search Report for PCT/US2013/072107 mailed Apr. 3, 2014.

*Primary Examiner* — Phutthiwat Wongwian
*Assistant Examiner* — Rene Ford
(74) *Attorney, Agent, or Firm* — Fishman Stewart PLLC

(57) ABSTRACT

An apparatus includes a gas turbine engine flow device having an inner member and a surrounding member. The inner member has a first coefficient of thermal expansion; and the surrounding member at least partially surrounds the inner member and has a second coefficient of thermal expansion that is different from the first coefficient of thermal expansion. The surrounding member includes at least two walls that form a variable flow gap therebetween. The inner member is oriented relative to the at least two walls of the surrounding member such that, based on the difference in the first and second coefficients of thermal expansion, the inner member expands relatively greater than the surrounding member or the surrounding member expands relatively greater than the inner member, according to a temperature change to correspondingly enlarge or reduce the size of the variable flow gap between the at least two walls.

19 Claims, 3 Drawing Sheets

(51) Int. Cl.
 *F01D 17/14* (2006.01)
 *F16K 31/00* (2006.01)
 *G05D 23/02* (2006.01)
(52) U.S. Cl.
 CPC ......... *F16K 31/002* (2013.01); *G05D 23/025* (2013.01); *G05D 23/022* (2013.01)

(56) References Cited

U.S. PATENT DOCUMENTS

| | | | |
|---|---|---|---|
| 3,368,756 A * | 2/1968 | Edwards | F24F 11/053 160/104 |
| 3,575,342 A * | 4/1971 | Puster | G05D 23/022 236/34 |
| 3,643,863 A * | 2/1972 | Wright | G05D 23/125 236/80 C |
| 3,711,236 A * | 1/1973 | Kinsella | F23Q 9/14 236/68 D |
| 3,799,432 A | 3/1974 | Schneider | |
| 3,804,326 A | 4/1974 | McIntire | |
| 3,814,313 A | 6/1974 | Beam, Jr. et al. | |
| 3,877,514 A * | 4/1975 | Beck | F28F 27/02 137/493 |
| 4,023,731 A | 5/1977 | Patterson | |
| 4,079,808 A | 3/1978 | Mizuno et al. | |
| 4,164,850 A * | 8/1979 | Lowi, Jr. | B60H 1/00007 165/62 |
| 4,171,767 A * | 10/1979 | Sliger | G05D 23/022 137/513.5 |
| 4,288,033 A * | 9/1981 | Wisyanski | G05D 23/134 236/100 |
| 4,311,272 A | 1/1982 | Foller | |
| 4,502,627 A | 3/1985 | Ty | |
| 4,805,398 A | 2/1989 | Jourdain et al. | |
| 5,022,817 A * | 6/1991 | O'Halloran | F01D 5/18 415/115 |
| 5,316,437 A | 5/1994 | Czachor | |
| 6,485,255 B1 * | 11/2002 | Care | F01D 5/187 415/12 |
| 6,860,432 B2 | 3/2005 | Conover et al. | |
| 8,020,782 B2 | 9/2011 | Moser et al. | |
| 2007/0028964 A1 * | 2/2007 | Vasquez | F03G 7/065 137/457 |
| 2007/0240689 A1 | 10/2007 | Fonville | |
| 2011/0129330 A1 | 6/2011 | Farrell | |
| 2012/0091212 A1 * | 4/2012 | Guilhamat | F03G 7/06 236/34.5 |

* cited by examiner

GAS TURBINE ENGINE THERMALLY CONTROLLED FLOW DEVICE

CROSS-REFERENCE TO RELATED APPLICATIONS

This application claims priority to U.S. Provisional Patent Application No. 61/774,176 filed Mar. 7, 2013, the contents of which are hereby incorporated in their entirety.

TECHNICAL FIELD

The present application relates to gas turbine engine flow control devices and more particularly, but not exclusively, to thermally controlled flow devices in gas turbine engines.

BACKGROUND

Gas turbine engine flow control devices remain an area of interest. Some existing systems have various shortcomings, drawbacks, and disadvantages relative to certain applications. Accordingly, there remains a need for further contributions in this area of technology.

SUMMARY

One embodiment of the present application is a gas turbine engine thermally controlled flow device including interacting members in which thermal expansion causes one member to exert a force against another member, which modulates a variable flow gap of the flow device. Other embodiments include unique methods, systems, devices, and apparatus to provide for a thermally controlled flow device. Further embodiments, forms, objects, aspects, benefits, features, and advantages of the present application shall become apparent from the description and figures provided herewith.

BRIEF DESCRIPTION OF THE DRAWINGS

Features of the application will be better understood from the following detailed description when considered in reference to the accompanying drawings, in which.

DETAILED DESCRIPTION

Figure 1:
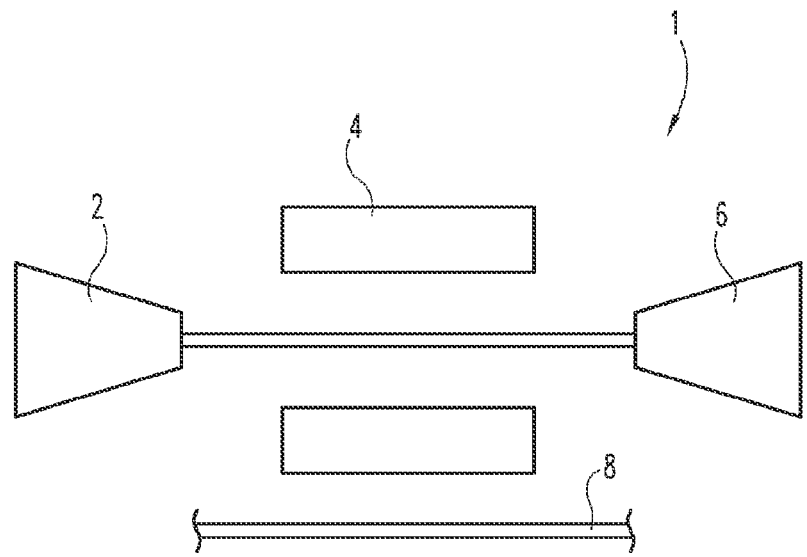
FIG. 1 is a diagram showing the major sections of a gas turbine engine and a flow device according to an embodiment.

While the present disclosure can take many different forms, for the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications of the described embodiments, and any further applications of the principles of the disclosure as described herein, are contemplated as would normally occur to one skilled in the art to which the disclosure relates.

Figure 2:
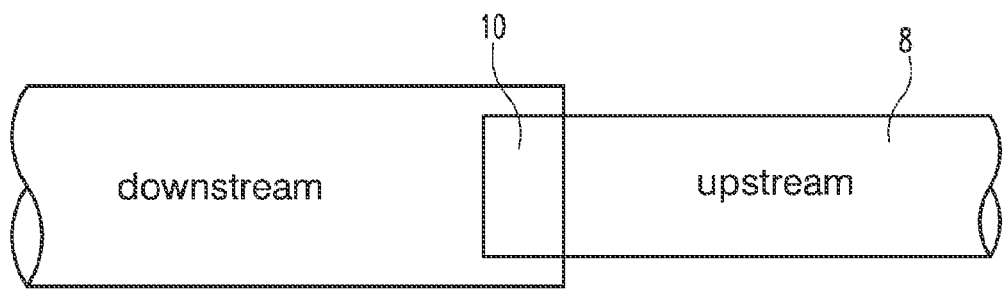
FIG. 2 is a diagram showing the gas turbine engine flow device in a fluid supply pipe according to an embodiment.

FIG. 1 is a diagram showing the major sections of a gas turbine engine 1 and a thermally controlled flow device 10 according to an embodiment. The gas turbine engine 1 includes a compressor section 2, a combustion section 4, and a turbine section 6. In an embodiment, the flow device 10 is disposed in a fluid supply pipe 8 of the gas turbine engine 1 that provides fluid flow to and/or from one or more sections of the gas turbine engine 1. FIG. 2 is a diagram showing the gas turbine engine flow device 10 in the fluid supply pipe 8 according to an embodiment. The fluid supply pipe 8 can be any type of fluid carrying pipe, for example, a supply pipe or a bleed pipe. In the illustrated embodiment, the flow device 10 controls passage of fluid through the fluid supply pipe 8 from the upstream end to the downstream end of the flow device 10. The gas turbine engine flow device 10 is not limited to incorporation in a fluid supply pipe 8, and other embodiments are contemplated herein. For example, the flow device 10 can be employed in an orifice between different sections and/or components of the gas turbine engine 1.

Figure 3:
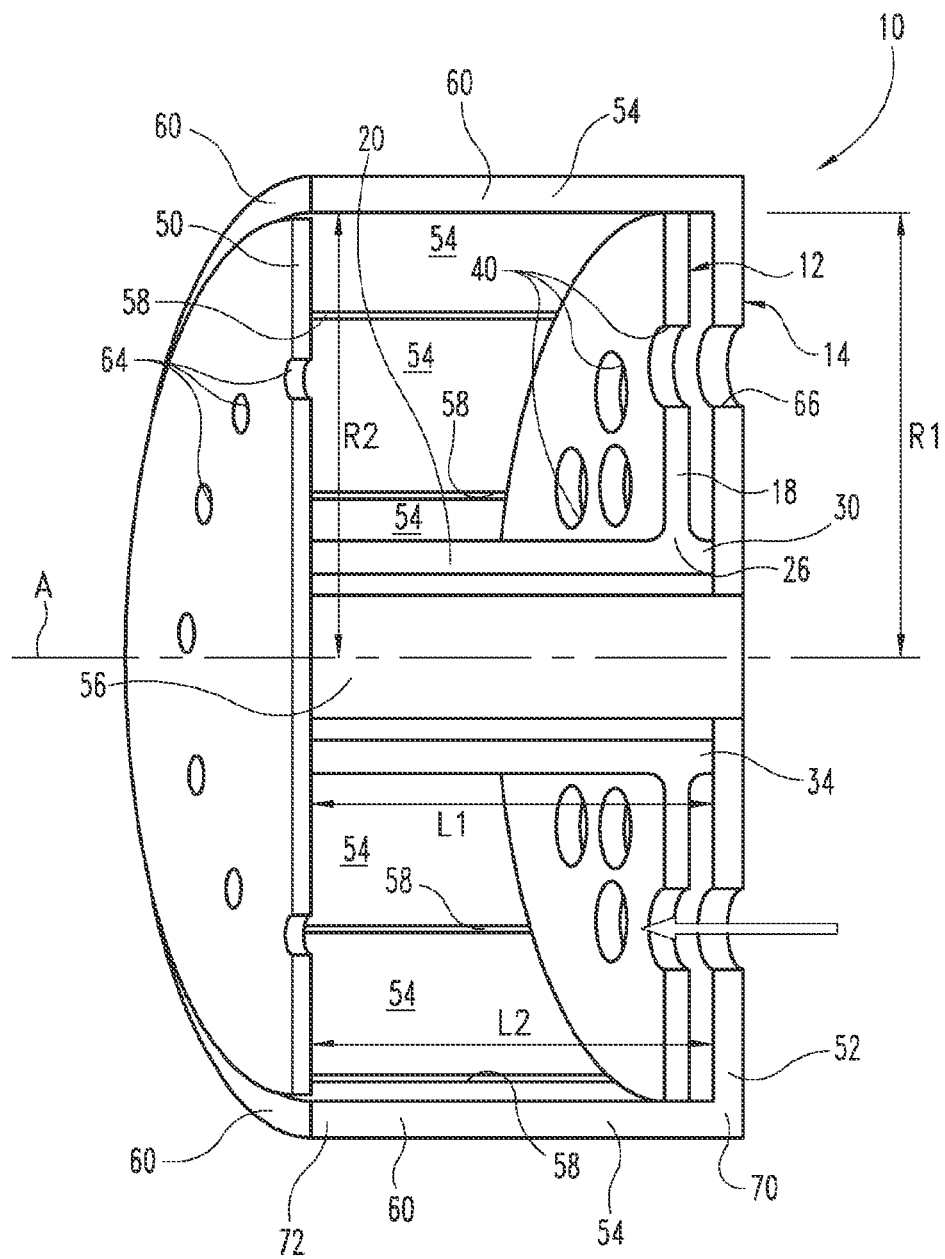
FIG. 3 is a cross-sectional view of a gas turbine engine thermally controlled flow device according to an embodiment.

FIG. 3 is a cross-sectional view of the gas turbine engine thermally controlled flow device 10 according to an embodiment. The flow device 10 includes an inner member 12 and an outer member, or enclosure 14, each having openings and being oriented relative to one another to provide an inlet flow path, a by-pass flow path, and a variable flow gap path. The variable flow gap varies in size according to the change in temperature of the components forming the flow device 10, as will be described in greater detail below. The flow device 10 may be used, for example, in a secondary air system on the gas turbine engine 1 to trim cooling, heating or sealing flow according to flow temperature which varies with the operating temperature. In one embodiment, the thermally controlled flow device 10 may be placed in the fluid supply pipe 8, such as a bleed pipe or air supply pipe, to tailor the flow more specifically than for example a standard metering orifice. One application of the flow device 10, as will be apparent from the description below, is to change the area of a metering orifice in proportion to the temperature change the flow device 10 experiences.

Referring to FIG. 3, the inner member 12 of the gas turbine engine flow device 10 is sized the same or slightly smaller than the enclosure 14 so that for example when the flow device 10 is not in operation, or operating at a predetermined temperature, the inner member 12 is oriented inside of the enclosure 14 in substantially abutting relation with the enclosure 14, for example, as shown. In an embodiment, the inner member 12 can be sized slightly greater than the enclosure 14 so that for example when the flow device 10 is not in operation, or operating at a predetermined temperature, the inner member 12 is oriented inside of the enclosure 14 to have an interference fit with the enclosure 14. The inner member 12 and the enclosure 14 each have a coefficient of thermal expansion that is different from that of the other. In one embodiment, the inner member 12 comprises a material having a high coefficient of thermal expansion, while the enclosure 14 comprises a material having a coefficient of thermal expansion relatively lower than that of the inner member 12. The difference in thermal expansion coefficients facilitates variations in the gap of the variable flow gap path.

In the illustrated embodiment, the inner member 12 includes an annular shaped inner disk 18 and an inner cylinder 20. The inner cylinder 20 axially coincides with the center of the inner disk 18 on a longitudinal axis A of the gas turbine engine thermally controlled flow device 10. The inner disk 18 lies in a plane that is substantially at right angles to the inner cylinder 20, that is, at substantially right angles to the longitudinal axis A. The center of the annular shaped inner disk 18 defines an opening 26. An end 30 of the inner cylinder 20 is connected to the inner disk 18 at the periphery of the opening 26. Further, the end 30 of the inner cylinder 20 extends axially beyond the inner disk 18 to provide a standoff 34, which will be described later.

The inner disk 18 of the gas turbine engine flow device 10 has a plurality of axial through openings 40. The through openings 40 are illustrated as circular holes but may have any shape suitable for the passage of fluid in a particular application. The through openings 40 are spaced apart circumferentially about the longitudinal axis A of the flow device 10, and circumferentially adjacent through openings 40 are radially offset from one another. In the illustrated embodiment, the through openings 40 are equally spaced apart and equally radially offset from one another, although the flow device 10 is not limited as such and other embodiments are contemplated. For example, the through openings 40 can be unequally spaced and have a radial and/or circumferential distribution, or a random distribution, depending on the desired flow characteristics of an application. Further, although the through openings 40 are shown to have the same shape, in an embodiment the through openings 40 have a different shape.

The enclosure 14 of the gas turbine engine flow device 10 includes first and second outer disks 50 and 52, multiple outer arcuate portions 54 that extend longitudinally (to the left in FIG. 3) from the periphery of the second outer disk 52, and a shaft 56. The multiple outer arcuate portions 54 are disposed circumferentially about the longitudinal axis L and circumferentially adjacent arcuate portions 54 have a groove 58 in the form of a slit or recess therebetween. The circumferentially disposed arcuate portions 54 form a generally cylindrical body 60, which, along with the shaft 56, is concentric with the inner cylinder 20 of the inner member 12. The first and second outer disks 50 and 52 are axially spaced apart along the longitudinal axis A of the flow device 10, and each lies in a plane that is substantially at right angles to the generally cylindrical body 60 and the shaft 56, that is, at substantially right angles to the longitudinal axis A. Other embodiments are contemplated herein, for example, the first and second outer disks 50 and 52 can be at other than right angles to the longitudinal axis A, and/or the first and second outer disks 50 and 52 can be disposed at different angles relative to the longitudinal axis A. The shaft 56 extends axially between the first and second outer disks 50 and 52, and at its ends is connected to the centers of the outer disks 50 and 52. Further, the first and second outer disks 50 and 52 and the generally cylindrical body 60 share as their common center axes the longitudinal axis A.

The first and second outer disks 50 and 52 of the gas turbine engine flow device 10 each have a plurality of longitudinal through openings 64 and 66, respectively. The through openings 64 of the first outer disk 50 form the by-pass flow path of the flow device 10. The illustrated through openings 64 are circular in shape, and are equally spaced apart circumferentially about the longitudinal axis A of the flow device 10 and lie substantially along the same radius relative to the longitudinal axis A. As with the through openings 40 disposed in the inner disk 18, the through openings 64 of the first outer disk 50 are not limited as shown and other embodiments are contemplated. Thus, the through openings 64 can have any shape, spacing, and/or distribution, for example, suitable for the passage of fluid in a particular application. For example, in an embodiment, the through openings 64 can comprise radially projecting circumferentially spaced apart slits that project for example from a radially inner portion of the first outer disk 50 to the outer diameter of the first outer disk 50, to form radially projecting circumferentially spaced apart ribs therebetween. Further, the through openings 64 can be unequally spaced apart, and/or radially offset from one another, and/or have a radial and/or circumferential distribution, or a random distribution, depending on the desired flow characteristics of an application. Further, although the through openings 64 are shown to have the same shape, in an embodiment the through openings 64 can have a different shape.

The through openings 66 of the second outer disk 52 are in substantial registry with, i.e. longitudinally aligned with, the through openings 40 of the inner disk 18 of the inner member 12. As will be appreciated, the through openings 66 can be in or out of registry with the through openings 40, or some through openings 66 in registry and some through openings 66 out of registry with the through openings 40, depending on the desired flow characteristics of the flow device 10. As with the through openings 40 disposed in the inner disk 18, and the through openings 64 disposed in the first outer disk 50, the through openings 66 disposed in the second outer disk 52 are not limited as shown and other embodiments are contemplated. Thus, for example, the through openings 66 can have any shape, spacing, and/or distribution, for example, suitable for the passage of fluid in a particular application. Further, although in the illustrated embodiment the quantity and arrangement of the through openings 66 are substantially similar to those of the through openings 40 of the inner disk 18, in an additional or alternative embodiment the quantity and/or arrangement may differ. Further, although the through openings 66 are shown to be circular and to have the same shape, in an embodiment the through openings 66 can have a noncircular shape and/or a different shape.

Together, the longitudinally aligned through openings 40, 66 of the respective inner disk 18 and second outer disk 52 form the inlet flow path of the gas turbine engine thermally controlled flow device 10. In operation of the flow device 10, fluid such as a turbine engine gas flows through the inlet flow path, through the interior of the enclosure 14, and through the by-pass flow path. The flow device 10 is not limited to such flow paths, and other embodiments are contemplated herein. For example, in an embodiment, the grooves 58 between the multiple arcuate portions 54 can also form a flow path; for example, a flow path that passes from the inside of the generally cylindrical body 60 substantially radially outward between the arcuate portions 54 of the generally cylindrical body 60.

One end 70 of the circumferentially disposed arcuate portions 54 is connected to the second outer disk 52 at the periphery of the second outer disk 52. An axially opposite end 72 of the circumferentially disposed arcuate portions 54 extends in close proximity to the periphery of the first outer disk 50. The variable flow gap path is provided between the ends 72 of the circumferentially disposed arcuate portions 54 and the periphery of the first outer disk 50. In the FIG. 3 embodiment, the variable flow gap has a ring or circular shape. As will be further described below, in operation of the flow device 10, the rate at which fluid such as a turbine engine gas passes through the variable flow gap path is based on changes in the temperature of the inner member 12 and the enclosure 14, and more particularly the thermal expansions of the inner member 12 and the enclosure 14.

As shown in FIG. 3, the inner member 12 rests inside of the enclosure 14 so as to abut, nearly abut, or interfere with, the inner surfaces of the enclosure 14 for example when the thermally controlled flow device 10 is not in operation, or operating at a predetermined temperature. In this embodiment, two portions of the inner member 12 interact with corresponding portions of the enclosure 14. The inner disk 18 of the inner member 12 has a radius R1 that is equal to, slightly less than, or slightly greater than, the radius R2 of the generally cylindrical body 60 that comprises the circumferentially disposed arcuate portions 54 of the enclosure 14, as measured from the longitudinal axis A of the flow device 20, so that the inner disk 18 fits within and abuts, nearly abuts, or interferes with, the inside diameter of the generally cylindrical body 60. Further, the inner cylinder 20 of the inner member 12 has a length L1 in the longitudinal direction that is equal to, slightly less than, or slightly greater than, the length L2 between the first and second outer disks 50 and 52 of the enclosure 14, i.e. the length L2 of the shaft 56 from the inside face of the first outer disk 50 to the inside face of the second outer disk 52 is equal to, slightly greater than, or slightly less than, the length L1 of the inner cylinder 20 of the inner member 12, so that the inner cylinder 20 fits between and abuts, nearly abuts, or interferes with, the first and second outer disks 50 and 52. The standoff 34 of the inner cylinder 20 maintains an axial gap between the inner disk 18 of the inner member 12 and the second outer disk 52 of the enclosure 14, which facilitates for example accommodation of radii in the respective components.

Figure 4:
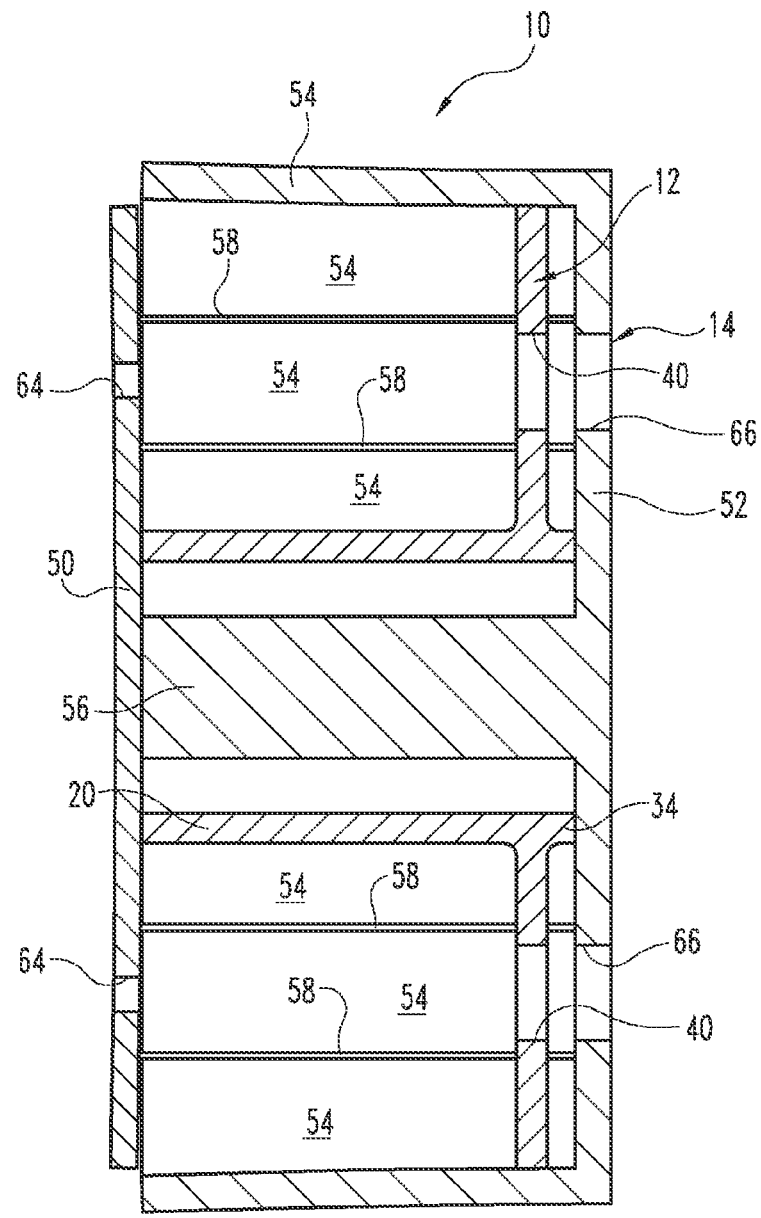
FIG. 4 is a cross-sectional view of the gas turbine engine thermally controlled flow device of FIG. 3, showing operation of the flow device in response to an increase in temperature.

Reference is now made to FIG. 4, which illustrates an example of operation of the gas turbine engine thermally controlled flow device 10 when the fluid flowing through the flow device 10 increases in temperature. In operation, fluid flows into the thermally controlled flow device 10 at the inlet flow path, and out from the flow device 10 at the by-pass flow path and the variable flow gap path. As the fluid temperature increases, the temperature of the inner member 12 and the enclosure 14 increases. Due to the inner member 12 comprising a relatively higher coefficient of thermal expansion than that of the enclosure 14, the inner member 12 thermally expands, that is grows, relative to the enclosure 14. As such, the inner disk 18 of the inner member 12 pushes radially outwardly against the circumferentially disposed arcuate portions 54 of the enclosure 14, creating radially outward movement of the ends 72 of the circumferentially disposed arcuate portions 54 at the variable flow gap path, and therefore increasing the size of the gap and the corresponding rate of fluid flow through the variable flow gap path. Additionally, the inner cylinder 20 pushes against the first outer disk 50 in the longitudinal direction, creating longitudinally outward movement of the first outer disk 50 at the periphery of the first outer disk 50, and thus further increasing the size of the variable flow gap and the corresponding rate of fluid flow through the variable flow gap path. As the temperature further increases, the inner member 12 further thermally expands and further exerts an outward force against the circumferentially disposed arcuate portions 54 and the first outer disk 50 of the enclosure 14, thus causing further increase in the size of the gap and the corresponding fluid flow rate. As will be appreciated, the variable flow gap path allows an increased fluid flow rate through the flow device 10 in proportion to an increase in temperature of the fluid flow and the flow device 10.

The gas turbine engine flow device 10 is not limited to the two portion interaction between the inner member 12 and enclosure 14 as shown in FIGS. 3 and 4; other embodiments are also contemplated herein. For example, the inner disk 18 is not limited to being disposed near the second outer disk 52, and instead can be located elsewhere along the longitudinal axis A, for example, midway along the longitudinal span of the generally cylindrical body 60, or near the first outer disk 50. Further, the inner cylinder 20 is not limited to its wall being disposed near the shaft 60, and instead its wall can be located elsewhere along the radius of the enclosure 14, for example, radially inward of the through openings 64 of the first outer disk 50 or at substantially the same radius as that of the first outer disk 50. Other embodiments are also contemplated; for example, the wall of the inner cylinder 20 can have through openings to accommodate fluid flow through the wall. Further, rather than an inner cylinder 20 having a cylindrical wall, as illustrated in FIGS. 3 and 4, in an embodiment the flow device 10 can employ multiple walls, for example, circumferentially spaced arcuate walls, space apart for example by slits to form an inner generally cylindrical body.

The gas turbine engine flow device 10 is not limited to the form illustrated in FIGS. 3 and 4 in which fluid flow rate increases with increased temperature; other embodiments are also contemplated herein. For example, in an embodiment, the flow device 10 is configured so that the variable flow gap path allows less fluid flow through the flow device 10 as temperature increases. In such embodiment, the inner member 12 comprises a material having a low coefficient of thermal expansion, while the enclosure 14 comprises a material having a coefficient of thermal expansion relatively higher than that of the inner member 12. The variable flow gap may be preset to be open when for example the flow device 10 is not in operation or operating at predetermined temperature. With this arrangement, as the fluid temperature increases, the temperature of the inner member 12 and the enclosure 14 increases. Due to the enclosure 14 comprising a relatively higher coefficient of thermal expansion than that of the inner member 12, the enclosure 14 thermally expands, that is grows, relative to the inner member 12. As such, the circumferentially disposed arcuate portions 54 of the enclosure 14 push radially inwardly against the inner disk 18 of the inner member 12, creating radially inward movement of the ends 72 of the circumferentially disposed arcuate portions 54 of the enclosure 14 at the variable flow gap path, and therefore decreasing the size of the gap and the corresponding rate of flow through the variable flow gap path. In addition, the first outer disk 50 of the enclosure 14 longitudinally pushes against the inner cylinder 20, creating longitudinal inward movement of the first outer disk 50 at the periphery of the first outer disk 50, and thus further decreasing the size of the gap and the corresponding rate of fluid flow through the variable flow gap path. As the temperature further increases, the circumferentially disposed arcuate portions 54 and first outer disk 50 of the enclosure 14 further thermally expand and further exert an inward force against the inner member 12, thus causing further decrease in the size of the gap and the corresponding fluid flow rate through the variable flow gap path. As will be appreciated, in this embodiment the variable flow gap path reduces the fluid flow rate through the flow device 10 in proportion to an increase in temperature of the fluid and the flow device 10. In one embodiment, the thermally controlled flow device 10 closes the variable flow gap path due to an increase in temperature in the fluid and the flow device 10.

In the above described FIG. 3 embodiment, the circumferentially disposed arcuate portions 54 have grooves 58 in the form of recesses or slits therebetween that are sized and arranged in such a manner to obtain the necessary or desired displacements to change fluid flow area of the variable flow gap path. In an embodiment, the arcuate portions 54 maintain low stress levels that avoid permanent deformation in the flow device 10. In the FIG. 3 embodiment, both the circumferentially disposed arcuate portions 54 as well as the grooves 58 extend longitudinally from the second outer disk 52.

The gas turbine engine thermally controlled flow device 10 is not limited to the construction shown in FIGS. 3 and 4, and other embodiments are contemplated. For example, the size, quantity, and/or spacing of the circumferentially disposed arcuate portions 54 and the grooves 58 may be increased or decreased to obtain a suitable fluid flow area change rate or proportion. The grooves 58 may comprise slits, that is, through the thickness, and/or recesses, that is, partially through the thickness. The arcuate portions 54 and the grooves 58 can have an even distribution or uneven, or random, distribution. In one embodiment, the circumferentially disposed arcuate portions 54 are circumferentially spaced apart by the grooves 58. In another embodiment, the grooves 58 form recessed portions between the circumferentially disposed arcuate portions 54. Further, the grooves 58 may extend from a location other than the periphery of the second outer disk 52, for example, further downstream of the second outer disk 52. The grooves 58 may have a variable depth extending from the first outer disk 50 to the second outer disk 52. Further, the grooves 58 may extend the full length or only a portion of the length of the enclosure 14.

The thermally controlled flow device 10 of FIG. 3 comprises various arrangements of disks, cylinders, and shafts. The flow device 10 is not limited as such and contemplates other geometries and/or arrangements. For example, the dimensions of the components may be sized to fit a particular cross-section of a bleed pipe, air supply pipe, or other fluid conveying member. Further, although the inner member 12 of the thermally controlled flow device 10 is described and shown in the FIG. 3 embodiment as being inner relative to the enclosure 14, the flow device 10 is not limited to such arrangement. In one embodiment, the flow device includes an expanding member bordered by two walls so as to abut the two walls. The flow device is disposed in for example a bleed pipe, with the two walls trapping the expanding member therebetween, and providing a variable flow gap path between the upstream end of the two walls and the downstream end of the two walls. In such embodiment, thermal expansion of the expanding member causes displacement between the two walls. The displacement, in turn, causes the area of the variable flow gap path to increase, allowing increased flow through the bleed pipe from the upstream end of the flow device to the downstream end of the flow device.

The gas turbine engine flow device 10 can be tailored to a range of metered flows by for example altering the materials of the inner member 12 and enclosure 14, or by altering the size, quantity, and/or spacing of the components. In an embodiment, the flow device 10 may be tailored to respond quickly or more slowly depending on the requirements of a particular application. Further, the flow device 10 may be designed to open or close flow area with increasing flow temperature. In an embodiment, the flow device 10 controls flow of air, although other types of fluid are also contemplated.

In an embodiment, the thermally controlled flow device 10 is used for modulating the fluid flow in the gas turbine engine 1 for blade track, bleed heat exchanger and cooling, to improve for example the operational specific fuel consumption (SFC). In a further embodiment, the thermally controlled flow device 10 may be used in an inlet or an inlet particle separator, for example, to limit the anti-ice flow when bleed temperatures exceed limits for various materials such as aluminum or composites, for example. In still a further embodiment, the flow device 10 may be used in compressor bleed flow to assist with stall/surge control. In a further embodiment, the flow device 10 is configured in a tip clearance control system of the gas turbine engine 1 to modulate meter flow to improve SFC. In another embodiment, the flow device 10 could be used to boost bearing sump buffer pressures at idle to improve bearing compartment sealing and thus avoid oil smell.

Although the flow device 10 has been described herein as having applicability to gas turbine engines, it will be appreciated that other applications may also be suitable.

Any theory, mechanism of operation, proof, or finding stated herein is meant to further enhance understanding of embodiment of the present disclosure and is not intended to make the present disclosure in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the disclosure have been illustrated and described in detail in the drawings and foregoing description, the same is to be considered as illustrative and not restrictive in character, it being understood that only the selected embodiments have been shown and described and that all changes, modifications and equivalents that come within the spirit of the disclosure as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow.

What is claimed is:

1. An apparatus comprising:
   a gas turbine engine flow device including an inner member and a surrounding member;
   the inner member having a first coefficient of thermal expansion; and
   the surrounding member at least partially surrounding the inner member and having a second coefficient of thermal expansion that is different from the first coefficient of thermal expansion of the inner member;
   the surrounding member including at least two walls that include a planar first wall and a cylindrical second wall that form a variable flow gap between an end of the second wall and an outer periphery of the first wall,
   wherein the inner member is oriented relative to the at least two walls of the surrounding member such that, based on the difference in the first and second coefficients of thermal expansion, the inner member expands relatively greater than the surrounding member or the surrounding member expands relatively greater than the inner member, according to a temperature change to correspondingly enlarge or reduce the size of the variable flow gap between the at least two walls.

2. The apparatus of claim 1, in which the inner member has a coefficient of thermal expansion that is greater than the coefficient of thermal expansion of the surrounding member, so that the inner member expands to exert a force against the at least two walls that urges apart the at least two walls relative to one another, which correspondingly enlarges the size of the variable flow gap between the at least two walls.

3. The apparatus of claim 1, in which the surrounding member has a coefficient of thermal expansion that is greater than the coefficient of thermal expansion of the inner member, so that the surrounding member expands to exert a force against the inner member that urges the at least two walls closer together, which correspondingly reduces the size of the variable flow gap between the at least two walls.

4. The apparatus of claim 1, in which the at least two walls close the variable flow gap in response to a temperature change that is an increase in temperature.

5. A gas turbine engine comprising:
   the apparatus of claim 1,
   wherein the gas turbine engine flow device is configured to change the area of the variable flow gap in proportion to the temperature change in the flow device.

6. An apparatus comprising:
   a gas turbine engine fluid adjusting device including a first member and a second member; and
   the second member including opposing walls defining a flow path area therebetween, wherein one of the opposing walls is a planar wall and the other is a cylindrical wall,
   the first member being oriented relative to the opposing walls of the second member such that, based on dissimilar coefficients of thermal expansion of the first member and the second member, as temperature of the fluid changes, the first member urges ends of the opposing walls apart or the second member urges the ends of the opposing walls closer together, to change the flow path area between the opposing walls in a variable flow gap.

7. The apparatus of claim 6, in which the first member of the gas turbine engine fluid adjusting device has a coefficient of thermal expansion greater than the coefficient of thermal expansion of the second member.

8. The apparatus of claim 6, in which the opposing walls enlarge the flow path area in response to an increase in temperature.

9. The apparatus of claim 6, in which the opposing walls reduce the flow path area in response to an increase in temperature.

10. The apparatus of claim 9, in which the opposing walls close the flow path area in response to the increase in temperature.

11. A gas turbine engine comprising:
    the apparatus of claim 6; and
    the gas turbine engine fluid adjusting device being configured to change the area of the variable flow gap in proportion to the temperature change in the gas turbine engine fluid adjusting device.

12. The apparatus of claim 11, in which the first member and the second member of the gas turbine engine fluid adjusting device interact to change the flow rate of the fluid in proportion to the change in temperature of the fluid.

13. The apparatus as claimed in claim 6, wherein the opposing walls form the variable flow gap therebetween.

14. A method of controlling fluid flow in a gas turbine engine fluid flow passage, comprising:
    passing fluid through a gas turbine engine flow control device in the gas turbine engine fluid flow passage at a flow rate at a first temperature, the flow control device including a first member and a second member, the first and second members including respectively a planar first wall and a cylindrical second wall that form opposing walls defining a flow path area between an end of the second wall and a periphery of the first wall, the first and second members having dissimilar coefficients of thermal expansion, and
    wherein the first member urges the opposing walls apart or the second member urges the opposing walls closer together when fluid flows through the flow control device at a second temperature, which changes the flow path area between the opposing walls based on the dissimilar coefficients of thermal expansion and changes a corresponding flow rate through the gas turbine engine fluid flow passage associated with the change in the flow path area.

15. The method of claim 14, in which the first member of the gas turbine engine flow control device has a coefficient of thermal expansion greater than the coefficient of thermal expansion of the second member of the gas turbine engine flow control device.

16. The method of claim 14, in which the second predetermined temperature is greater than the first predetermined temperature so that, based on the dissimilar coefficients of thermal expansion, the first member urges the opposing walls apart to enlarge the flow path area and the corresponding flow rate through the fluid flow passage in response to the increase in temperature.

17. The method of claim 14, in which the second predetermined temperature is greater than the first predetermined temperature so that, based on the dissimilar coefficients of thermal expansion, the second member urges the opposing walls closer together to reduce the flow path area and the corresponding flow rate through the fluid flow passage in response to the increase in temperature.

18. The method of claim 17, in which the opposing walls close the flow path area in response to the increase in temperature.

19. The method of claim 14, wherein the change in flow path area is in proportion to the temperature change in the gas turbine engine flow control device.

* * * * *